United States Patent [19]

Erskine

[11] 4,118,236

[45] Oct. 3, 1978

[54] CLAY COMPOSITIONS

[75] Inventor: Clive Arnold Erskine, Forestville, Australia

[73] Assignee: ACI Technical Centre Pty Ltd., Waterloo, Australia

[21] Appl. No.: 775,869

[22] Filed: Mar. 9, 1977

[30] Foreign Application Priority Data

Mar. 15, 1976 [AU] Australia ............................ PC5218

[51] Int. Cl.² ........................................... C04B 35/00
[52] U.S. Cl. ......................................... 106/71; 106/72
[58] Field of Search .............................. 106/71, 72, 67

[56] References Cited

U.S. PATENT DOCUMENTS

| 2,388,060 | 10/1945 | Hicks | 106/71 X |
| 2,904,267 | 9/1959 | Lyons | 106/72 UX |
| 2,956,893 | 10/1960 | Houston et al. | 106/71 X |
| 3,130,063 | 4/1964 | Millman et al. | 106/72 X |
| 3,458,329 | 7/1969 | Owens et al. | 106/39.5 |
| 3,785,838 | 1/1974 | Weidman | 106/67 X |
| 4,013,476 | 3/1977 | Veda et al. | 106/71 X |

FOREIGN PATENT DOCUMENTS 1,050,985 12/1966 United Kingdom ...................... 106/72

*Primary Examiner*—J. Poer
*Attorney, Agent, or Firm*—Pennie & Edmonds

[57] ABSTRACT

A method of preparing a reinforced clay based article is described. A mixture of clay and reinforcement is shaped, dried and then fired at a temperature and for a time sufficient to stabilize the clay against redispersion in water. without forming a ceramic article.

26 Claims, 1 Drawing Figure

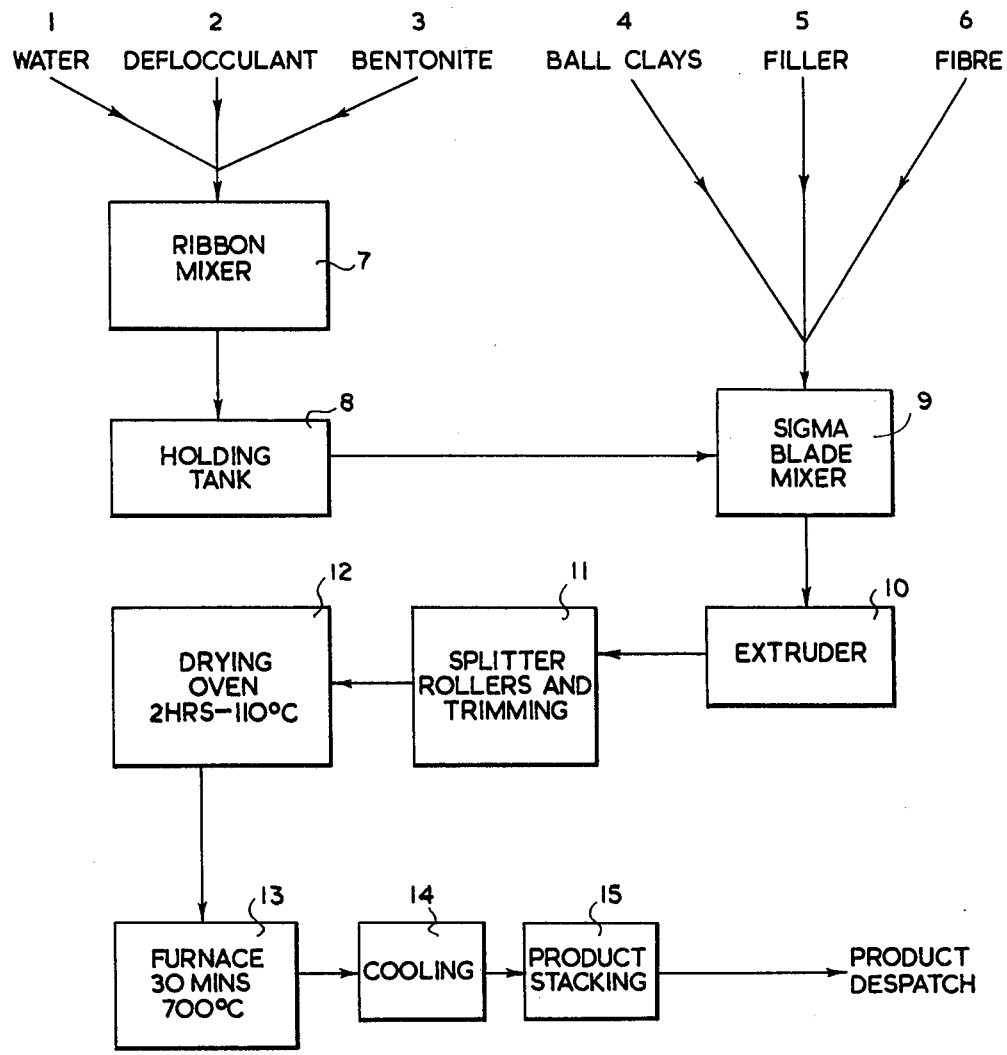

CLAY COMPOSITIONS

This invention relates to improved clay compositions and methods for processing same. In a particular aspect, the invention relates to clay compositions which may be used as an alternative to products manufactured from cementitious compositions containing fibre reinforcement such as asbestos cement sheets, pipes and mouldings.

Asbestos cement (A.C.) products are used as building materials on a world-wide scale. In many cases, both in domestic and commercial construction, there is no alternative at present available that combines the properties of durability, light weight, high strength and low cost typical of A.C. products. Many factories are constructed using corrugated A.C. roofing with cladding of flat, moulded or corrugated panels.

A considerable market exists for A.C. pressure, sewer, conduit and drainage pipes, particularly in the medium size ranges. Such pipes have particular advantages in remote areas, where transport costs favour a lightweight material, and in some environments where chemical resistance is required.

In recent years industries using asbestos, becoming aware of health hazards associated with the fibre, have been searching for safe alternative reinforcing materials. Textile glass fibres are produced in filament diameters of a sufficient size to render them non-respirable, and therefore unable to cause pneumoconiosis or mesothelioma frequently attributed to asbestos.

At present the only product alternative for cement reinforcement in many applications is alkali resistant glass fibre, conventional "E-glass" fibre being unsuitable because it is attacked by the alkaline environment of hydrating cement. Unfortunately, this fibre is incompatible with traditional A.C. sheet and pipe forming techniques and is prohibitively expensive.

The long-term future of A.C. products is now in doubt; not because the material is in any way obsolete, but because many countries are now introducing legislation imposing limits on atmospheric concentrations of asbestos and bans on its use.

Thus, there is a definite need for an alternative material to A.C. similar in physical properties and cost. The preferred requirements for such an alternative material are:

a. low raw material costs through the use of cheap, readily available components.
b. adaptability to rapid, mass production techniques.
c. physical and chemical stability.
d. modulus of rupture, density, impact strength and other physical properties similar to those of A.C.

Hitherto, clay based building products have been well known and used in the building industry, but have not been considered for use as replacements for A.C. A clay based material becomes a ceramic when it is fired to produce substantial formation of glassy phases or new crystalline species in the clay component of the material. In biblical times unfired bricks using mud with straw as a fibrous reinforcement were common. Modern clay bricks are superior to such earlier varieties as the high firing temperatures employed in their manufacture generally well in excess of 950° C., convert the clay to a ceramic which is very hard and rigid and has excellent weather resistance. Whilst the physical properties of ceramics make them excellent for use as bricks, their brittle nature makes them unsuitable for use as thin sheets such as would be required to replace A.C. Even if ceramics were reinforced with fibres which could withstand the high ceramic firing temperatures, the brittle nature of the ceramic would give rise to multiple cracking if a thin reinforced ceramic sheet were subjected to the handling and hammering to which A.C. is subjected.

Applicants have found that specific types of clay compositions when reinforced with fibre, can be processed to produce thin sheets having properties similar to A.C., provided that the processing of the compositions and the choice of reinforcement falls within experimentally determined limits. This has proved possible because clay compositions which are fired within specific temperature limits achieve a "stabilised" stage at which the clay can be rendered resistant to re-dispersion in water when the clay lattice hydroxyl ions are substantially removed without the formation of a ceramic. The temperature range for this stabilisation is 500° C., to 800° C., and maximum strength for the stabilised clay is generally developed in the range 600° C., to 725° C.

BRIEF DESCRIPTION OF THE DRAWING

The drawing is a flowsheet showing the process of the invention.

Because of the unusually low firing temperature, the material formed (reinforced stabilised clay, or R.S.C.) is quite unlike a conventional ceramic normally formed at temperatures in excess of 950° C. Dimensional changes on firing are very small, there is no evidence of vitrification and the porosity of the fired material is comparatively high. R.S.C. does not normally, exhibit the characteristic of brittle failure typical of fired ceramics, but fails under transverse loads in a manner similar to reinforced cementitious composites. Impact strength, due partially to the porous nature of the matrix and partially to the presence of reinforcing fibres, permits thin sheets of R.S.C. to be nailed without the propagation of cracks, a property which is totally unexpected, judging by the properties of ceramic articles which are based on clay.

A further factor which distinguishes articles manufactured according to the invention from the higher temperature fired ceramics, is that the strength of the fired composition is related to its air dried strength, rather than the strength which would be achieved at firing temperatures for conventional ceramics. Firing has the effect of stabilising the product against the effects of water — without such firing the air-dried product would readily disintegrate once it came into contact with water.

Another surprising feature of R.S.C. is its apparently good weather resistance. Whereas clay bricks which are underfired (e.g. at temperatures in the range 950° C. to 1,000° C.) generally disintegrate or degrade after some time in an autoclave, thus reflecting their poor weather resistance. R.S.C. despite its lower firing temperatures shows a surprising lack of degradation under autoclave conditions, as is evidenced by the results quoted in example 5 described hereinafter.

The invention provides a method of producing reinforced thin sectioned clay based articles, such as sheets, pipes or the like, having a modulus of rupture of at least 10 MPa and a modulus of elasticity no greater than 16 GPa, including the steps of forming a shaped mixture comprising the following ingredients in substantially the proportions specified by percentage weight of the total solids in the composition:

Fibrous reinforcement selected from the group consisting of glass fibre, carbon fibre, mineral wool, ceramic fibre, asbestos or mixtures of two or more thereof — 1% to 30%

Clay selected from the group consisting of montmorillonitic clay, kaolinitic clay, illitic clay, or mixtures of two or more thereof — 5% to 95%

Fillers — 0% to 90%

Water — 20% to 100% drying the shaped mixture, and firing the dried shapes at a temperature in the range of 500° C. to 800° C. for a time sufficient to produce substantial stabilisation against redispersion in water of the clay in the composition without forming a ceramic article therefrom.

Glass fibre is the preferred reinforcing material for the composition, although other fibres which do not degrade at the firing temperatures such as mineral wool, ceramic fibres or wool glass, are also suitable. Glass fibre in the form of E-glass roving with a filament diameter of about 12 microns, chopped to lengths suitable for even dispersion in the matrix material is particularly suitable. Generally, a fibre length of 12 mm or less is satisfactory. Sizing is not required for glass used in the composition, but for practical purposes it is preferable to use a roving with a small quantity of a water-soluble size such as starch. In cases where mixing damage is severe, a suitable size can minimise fibre breakdown. A typical chemical composition for E-glass is:

$SiO_2$; 54.3%
$Al_2O_3 + Fe_2O_3$; 15.2%
$CaO$; 17.3%
$MgO$; 4.7%
$Na_2O + K_2O$; 0.6%
$B_2O_3$; 8.0%
$F_2$; 0.1%

Chemically, the montmorillonite used in the composition is described as a hydrous aluminium silicate containing small amounts of alkali and alkaline earth metals. Structurally, montmorillonite consists of two basic building blocks; the alumina octahedral sheet and the silica tetrahedral sheet. A single montmorillonite unit cell consists of two silica tetrahedral sheets, between which is an alumina octahedral sheet. Substitutions within the lattice result in a negative charge which is balanced by cations on the basal surfaces. In naturally occurring montmorillonites, the exchangeable cations are usually sodium and calcium.

The montmorillonitic clay preferred for use in the composition is a bentonite, containing sodium montmorillonite as the principal clay mineral component.

A typical "normal" bentonite has the chemical composition:

$SiO_2$; 62.0%
$Al_2O_3$; 20.9%
$Fe_2O_3$; 3.8%
$TiO_2$; 0.15%
$K_2O$; 0.47%
$Na_2O$; 2.2%
$MgO$; 2.7%
$CaO$; 1.2%
Loss on ignition
(1,000° C.); 5.6%

An "abnormal" bentonite, having a dehydroxylation temperature of 520° C., was found to contain 11.6% $Fe_2O_3$.

The kaolinitic clay used in the material should preferably contain less than 20% quartz and should have a size distribution such that about 80% of particles are less than 2 microns.

Chemically, kaolinite can be represented by the ideal formula $Al_1Si_2O_5(OH)_4$. Structurally, kaolinite consists of layers which comprise a single silica tetrahedral sheet and an alumina octahedral sheet. The dehydroxylation temperature varies from one clay to another, but is generally in the range 500°–650° C. On dehydroxylation, a disordered phase, metakaolin, is formed.

A plastic kaolinite clay, suitable for inclusion in the material has the chemical composition:

$SiO_2$; 63.08%
$TiO_2$; 0.97%
$Al_2O_3$; 25.60%
$Fe_2O_3$; 0.54%
$FeO$; 0.02%
$MnO$; 0.02%
$MgO$; 0.47%
$CaO$; 0.14%
$Na_2O$; 0.33%
$K_2O$; 0.17%
$P_2O_5$; 0.05%
Loss on ignition; 8.62%

The mineralogical composition of this clay is:
Kaolinite
quartz
small amount of montmorillonite Depending upon the proportions and particle sizes of any other clays used, it is permissible to use a coarse illitic clay — for example, a clay having a particle size distribution such that at least 30% of the particles are smaller than 2 microns.

Illite is a mica-like clay mineral which differs from well-crystallised micas in the degree of substitution of $Al^{3+}$ for $Si^{4+}$ and consequently has a different unbalanced charge deficiency per unit cell. Like montmorillonite, the structure consists of an alumina octahedral sheet between two silica tetrahedral sheets. The balancing cations, predominantly potassium, are not readily exchangeable. The dehydroxylation temperature for illite is about 550° C.

An illitic clay found to be suitable for inclusion in the material has the chemical composition:

$SiO_2$; 64.9%
$TiO_2$; 0.96%
$Al_2O_3$; 23.5%
$Fe_2O_3$; 0.37%
$FeO$; 0.02%
$MnO$; 0.01%
$MgO$; 0.27%
$CaO$; 0.04%
$Na_2O$; 0.15%
$K_2O$; 0.38%
$P_2O_5$; 0.06%
Loss on ignition; 8.86%
Total S as $SO_3$; 0.08%

Fillers used in the material may take a number of forms. Accessory non-clay minerals, such as quartz and feldspars, in the clay used may in a sense be regarded as fillers. However, the intentional inclusion of fillers may be useful in obtaining desired physical properties for a particular product.

Examples of non-clay fillers are:
pulverised fuel ash; feldspars
fine silica; blast furnace slag
diatomaceous earth;

In addition, further clay minerals in the form of non-plastic clays, crushed shales or minerals such as talc and pyrophyllite may be included as fillers. Calcium-rich fillers are avoided because of the adverse effect of calcium ions on the efficiency of deflocculants. Where a high strength R.S.C. article is required, the use of deflocculants to improve strength characteristics is desirable. A deflocculating agent aids in the dispersion of clay particles in water, lowers the viscosity of the dispersion and promotes face-to-face contact of the clay platelets.

Some deflocculants found to be effective are:
Sodium hexametaphosphate
Sodium silicate
Sodium metasilicate
"Dispex N40" (from Allied Colloids Pty. Ltd.)
"Orotan 850" (from Rohm and Haas Australia Pty. Ltd.)

The range of possible deflocculants is very large and it is probable that many additives used in conventional clay processing will perform at least as well as those listed above.

Fluxes may be incorporated in the composition to increase surface hardness and reduce the rate of water absorption. Boric acid and lithium carbonate, introduced at levels of 0.5–2%, have been found to be effective. During the drying process, water soluble fluxes tend to migrate to the exposed surfaces and their effect on firing is limited to areas of high concentration.

Additives such as water-soluble cellulose derivatives or solutions of polyethylene oxide may be included at low levels (about 0.05% on solids weight) to improve plasticity and extrusion properties.

In addition to the clay minerals already mentioned, chlorites and mixed layer montmorillonitic minerals may be included in the composition.

A further reinforcing agent is muscovite or biotite mica, ground to give a maximum particle size of about 2 mm. The strengths achieved are much inferior to those with similar levels of glass fibre reinforcement, and the platelike nature of mica impedes the drying process.

The formation of a high strength material is achieved by carefully choosing the combination of raw materials to achieve a favourable particle size distribution. Due to the variable nature of clays even of similar mineralogy and chemical composition, no rigid specifications can be proposed. However, as a general rule, the maximum particle size of at least 95% of the composition components should not exceed 200 microns and the composition should preferably contain 20 to 100%, more preferably 30 to 60%, of particles less than 2 microns.

Traditionally, the temperature at which clays lose hydroxyl ions have been regarded as the temperature at which major problems can develop in the firing of ceramic articles. Loss of strength during dehydroxylation has long been known to cause cracking and laminations, particularly in extruded bodies. As temperatures rise above the dehydroxylation temperature, there is often a rapid increase in strength, sometimes to very nearly the strength of the fired (e.g. 1000° C.) material. This tendency appears to be strongest in plastic clays of high green strength.

The reason for this rapid gain in strength appears to be unrelated to the strength mechanisms of conventional ceramics. At the firing temperatures recommended for the material, there is no evidence of vitrification or reduction in porosity. The bonding mechanism of the material appears to be related to changes in clay minerals subsequent to dehydroxylation.

It appears that dehydroxylation results in an increase in the disorder of clay mineral structures: kaolinite becomes virtually X-ray amorphous, montmorillonites collapse in the c-axis direction, and illites show some loss of order in their X-ray diffraction patterns. It also appears that there is some relaxation in the structural constraints imposed on the silica tetrahedral layers, resulting in the formation of spiral structures.

On firing to about 700° C., the material generally has at least double the flexural strength and much greater hardness than the dried, unfired material. This suggests changes in bonding both within individual particles and between particles. It is proposed without limiting the invention to this proposal that the new structures formed by the silica tetrahedral layers interlock to form a strong intra-particle and inter-particle network. The formation of this network is enhanced by the presence of certain ions; such as $Na^+$, $Fe^{3+}$ and $PO_4^{3-}$; which possibly perform a bridge-forming function.

After firing, rehydration and rehydroxylation can occur over a period of time. This process occurs without loss of integrity and the clays do not return to their former plastic state. Rapid rehydration in saturated steam at elevated pressures has been shown to cause an increase in strength.

The following examples illustrate the range of compositions that can be used to produce a material which, when formed into a flat sheet, has properties similar to A.C. The procedure used in the preparation of test samples is:

a. disperse bentonite, if required in the formulation, in a solution of defloccuIant in water, mixing the components in the required relative proportions;
b. allow the dispersion to gel for 16–24 hours.
c. weigh the required amount of gel into the bowl of a planetary mixer (for large-scale preparation, a sigma blade mixer is preferable).
d. commence mixing, adding in order: clays, filler and fibre;
e. mix until fibre is evenly distributed;
f. place on a smooth, flat substrate and spread the dough-like material using a roller, to form a sheet with a thickness of about 4.5 mm.
g. trim to size using a sharp knife;
h. dry 2–3 hours at 110° C.;
i. fire 30 minutes at 700° C. unless otherwise specified;

The material is highly resistant to thermal shock - firing is simply achieved by placing the dried sample directly in a furnace operating at the firing temperature and removing it at the termination of the firing period.

In the following examples, all component percentages are by weight of total solids.

EXAMPLE 1

Using the procedure described, a flat sheet may be prepared from the following components:
Bentonite; 7%
Kaolinitic Clay; 26%
Illitic Clay; 20%
Talc; 40%
E-glass Fibre; 7%
Water; 31.5% solids weight
"Dispex N40"; 0.3% solids weight
Sodium Hexamet-phosphate; 0.3% solids weight The material produced has the following physical properties:

modulus of rupture; 26 MPa
oven dried bulk density; 1650 kg/m$^3$
water absorption; 18% (immersion for 24 hours)
flexural modulus of elasticity; 10.6 GPa

EXAMPLE 2

When a sheet is prepared according to Example 1, but at different firing temperatures, the following physical properties may be obtained:

| Firing Temperature °C | Modulus of Rupture MPa | Density kg/m$^3$ | Water Absorption % | Modulus of elasticity GPa |
|---|---|---|---|---|
| 600 | 26 | 1700 | 14 | 11 |
| 650 | 26 | 1700 | 14 | 11 |
| 750 | 23 | 1700 | 14 | 11 |
| 800 | 21 | 1800 | 14 | |

EXAMPLE 3

When a sheet is prepared according to Example 1, but at different firing times, the following physical properties may be obtained:

| Firing Time hours | Modulus of Rupture MPa | Density kg/m$^3$ | Water Absorption % | Modulus of elasticity GPa |
|---|---|---|---|---|
| 0.25 | 16 | 1700 | 16 | 5 |
| 1 | 22 | 1700 | 16 | 11 |
| 8 | 24 | 1700 | 16 | 12 |
| 24 | 15 | 1650 | 16 | |

EXAMPLE 4

When a sheet is prepared according to Example 1, but other "fillers" are substituted, the following physical properties may be obtained:

| Filler | Modulus of Rupture MPa | Density kg/m$^3$ | Water Absorption % | Modulus of elasticity GPa |
|---|---|---|---|---|
| non-plastic claystone argillaceous | 19 | 1650 | 17 | 5 |
| laterite | 22 | 1650 | 22 | 5 |
| flint clay | 20 | 1600 | 16 | 5 |
| pyrophyllite | 14 | 1550 | 19 | 3 |
| limestone | 13 | 1800 | 22 | 5 |
| basalt | 18 | 1700 | 17 | 5 |
| volcanic breccia | 17 | 1600 | 21 | 5 |
| granite | 20 | 1600 | 22 | 4 |
| feldspar | 20 | 1650 | 20 | 5 |
| mica | 17 | 1450 | 24 | 6 |

EXAMPLE 5

When a sheet is prepared according to example 1, and subsequently subjected to saturated steam at a pressure of 1 MPa for different periods, the following physical properties may be obtained:

| Autoclaving time hours | Modulus of Rupture MPa | Density kg/m$^3$ | Water Absorption % | Modulus of elasticity GPa |
|---|---|---|---|---|
| 12 | 24 | 1600 | 16 | 12 |
| 16 | 30 | 1700 | 15 | 14 |
| 18 | 33 | 1650 | 15 | 15 |
| 24 | 34 | 1650 | 16 | 16 |
| 30 | 33 | 1650 | 16 | 15 |
| 36 | 32 | 1700 | 16 | 15 |
| 42 | 32 | 1700 | 15 | 15 |
| 48 | 26 | 1700 | 16 | 15 |
| 54 | 25 | 1700 | 16 | 14 |

EXAMPLE 6

When a sheet is prepared according to Example 1, substituting different additives, the following physical properties may be obtained:

| Additive | Modulus of Rupture MPa | Density kg/m$^3$ | Water Absorption % | Modulus of elasticity GPa |
|---|---|---|---|---|
| "Dispex A40"* | 17 | 1700 | 18 | 9 |
| sodium silicate/ sodium carbonate | 15 | 1600 | 22 | 8 |
| sodium carboxymethyl cellulose | 13 | 1550 | 23 | 7 |
| polyethylene oxide+ | 24 | 1550 | 22 | 10 |
| "Versicol"* | 26 | 1750 | 17 | 11 |
| "Dispex G40"* | 21 | 1700 | 20 | 9 |

+"Polyox WSR-301" supplied by Union Carbide Pty. Ltd.
*supplied by Allied Colloids Pty.Ltd.

EXAMPLE 7

When the level of glass fibre in Example 1 is reduced to 2% and the level of talc is increased to 45% the following physical properties may be obtained:
Modulus of rupture; 12 MPa
Density; 1700 kg/m$^3$
Water absorption; 16%
Modulus of elasticity; 9 GPa

EXAMPLE 8

When the level of glass fibre in Example 1 is increased to 20%, and the level of talc is reduced to 35%, the following physical properties may be obtained:
Modulus of rupture; 34 MPa
Density; 1750 kg/m$^3$
Water absorption; 17%
Modulus of elasticity; 9 GPa

EXAMPLE 9

When the level of bentonite in Example 1 is reduced to 2%, and the illitic clay is increased to 25%, the following physical properties may be obtained.
Modulus of rupture; 19 MPa
Density; 1700 kg/m$^3$
Water absorption; 18%
Modulus of elasticity; 8 GPa

EXAMPLE 10

When the level of bentonite in Example 1 is increased to 25% and the level of illitic clay is reduced to 2%, the following physical properties may be obtained.
Modulus of rupture; 22 MPa
Density; 1600 kg/m$^3$
Water absorption; 16%
Modulus of elasticity; 11 GPa

EXAMPLE 11

When the level of bentonite in Example 1 is increased to 40% illitic clay is eliminated and kaolinitic clay is reduced to 13%, the following physical properties may be obtained.
Modulus of rupture; 16 MPa
Density; 1750 kg/m$^3$
Water absorption; 16%
Modulus of elasticity; 7 GPa This proportion of bentonite is excessive, resulting in warping and internal voids. The indicated flexural strength is lower than the true strength of the material due to sample irregularities.

EXAMPLE 12

When the level of illitic clay in Example 1 is reduced to 0% and the level of kaolinitic clay is increased to 46%, the following physical properties may be obtained.
Modulus of rupture; 22 MPa
Density; 1750 kg/m$^3$
Water absorption; 16%
Modulus of elasticity; 11 GPa

EXAMPLE 13

When the level of illitic clay in Example 1 is increased to 80%, kaolinitic clay is eliminated and talc is reduced to 6%, the following physical properties may be obtained.
Modulus of rupture; 18 MPa
Density; 1550 kg/m$^3$
Water absorption; 23%
Modulus of elasticity; 6 GPa

EXAMPLE 14

When the level of kaolinitic clay in Example 1 is reduced to 0% and the level of illitic clay is increased to 46%, the following physical properties may be obtained.
Modulus of rupture; 16 MPa
Density; 1550 kg/m$^3$
Water absorption; 20%
Modulus of elasticity; 7 GPa

EXAMPLE 15

When the level of kaolinitic clay in Example 1 is increased to 80%, illitic clay is eliminated and talc reduced to 6%, the following physical properties may be obtained.
Modulus of rupture; 20 MPa
Density; 1650 kg/m$^3$
Water absorption; 20%
Modulus of elasticity; 8 GPa

EXAMPLE 16

When the level of talc in Example 1 is reduced to 0% and the level of illitic clay is increased to 60%, the following physical properties may be obtained.
Modulus of rupture; 21 MPa
Density; 1650 kg/m$^3$
Water absorption 20%
Modulus of elasticity; 6 GPa

EXAMPLE 17

When the level of talc in Example 1 is increased to 90% illitic and kaolinitic clays are eliminated and glass fibre is reduced to 5%, the following physical properties may be obtained.
Modulus of rupture; 11.5 MPa
Density; 1200 kg/m$^3$
Water absorption 22%
Modulus of elasticity; 6 GPa

EXAMPLE 18

When a sheet is prepared according to Example 1, but "Dispex N40" and sodium hemetaphosphate are omitted, the following physical properties may be obtained.
Modulus of rupture; 18 MPa
Density; 1650 kg/m$^3$
Water absorption; 20%
Modulus of elasticity; 8 GPa

EXAMPLE 19

When a sheet is prepared according to Example 1, but 0.1% "Dispex N40" (based on solids weight) is the only additive, the following physical properties may be obtained.
Modulus of rupture; 21 MPa
Density; 1650 kg/m$^3$
Water absorption; 19%
Modulus of rupture; 8 GPa

EXAMPLE 20

When a sheet is prepared according to Example 1, but 2% "Dispex N40" (based on solids weight) is the only additive, the following physical properties may be obtained.
Modulus of rupture; 21 MPa
Density; 1700 kg/m$^3$
Water absorption; 16%
Modulus of elasticity; 11 GPa

EXAMPLE 21

When a sheet is prepared according to Example 1, but 1% sodium hexametaphosphate (based on solids weight) is the only additive, the following physical properties may be obtained.
Modulus of rupture; 30 MPa
Density; 1650 kg/m$^3$
Water absorption; 16%
Modulus of elasticity; 12 GPa

EXAMPLE 22

When a sheet is prepared according to Example 1, but 5% sodium hexametaphosphate (based on solids weight) is the only additive, the following physical properties may be obtained.
Modulus of rupture; 18 MPa
Density; 1700 kg/m$^3$
Water absorption; 14%
Modulus of elasticity; 15 GPa

EXAMPLE 23

When a sheet is prepared according to Example 1, but other fibres are substituted for E-glass, the following properties may be obtained.

| Fibre | Modulus of Rupture MPa | Density kg/m$^3$ | Water Absorption % | Modulus of elasticity GPa |
|---|---|---|---|---|
| alkali-resistant glass | 20 | 1650 | 15 | 11 |
| bulk ceramic | 12 | 1650 | 16 | 8 |
| wool glass | 16 | 1650 | 16 | 10 |
| chrysotile asbestos | 13 | 1650 | 16 | 10 |
| mineral wool | 12 | 1650 | 16 | 8 |

EXAMPLE 24

A sheet may be prepared according to the procedure described using the following formulation.
glass fibre; 10%
kaolinitic clay; 90%
water; 31.5% solids weight
The following physical properties may be obtained.
Modulus of rupture; 12 MPa
Density; 1450 kg/m$^3$
Water absorption; 23%

If 0.6% "Dispex N40", based on solids weight, is included in the above formulation, the following physical properties may be obtained.

Modulus of rupture; 20 MPa
Density; 1500 kg/m$^3$
Water absorption; 22%

If the material containing "Dispex N40" is subsequently autoclaved at 1 MPa for 24 hours, the modulus of rupture could be expected to increase to about 29 MPa.

EXAMPLE 25

When a sheet is prepared according to Example 1, but glass fibre is replaced by 12 mm chopped carbon fibre and the talc level is adjusted to balance a reduced fibre level, the following physical properties may be obtained.

| Carbon fibre % | Talc % | Modulus of Rupture MPa | Density kg/m$^3$ | Water Absorption % | Modulus of elasticity GPa |
|---|---|---|---|---|---|
| 1 | 46 | 9 | 1500 | 18 | 8 |
| 2 | 45 | 11 | 1500 | 18 | 8 |
| 3 | 44 | 11 | 1500 | 19 | 8 |

The preceding examples may be adapted for mechanical production, generally by small formulation variations such as changes in water content.

A method of mechanically producing flat sheets of the material is:

a. bentonite 3, if required, is dispersed in a solution of deflocculants 2 in water 1 by any suitable means such as a ribbon mixer 7, after mixing the dispersion is moved to a holding tank 8;

b. the other components such as ball clays 4, filler 5, and fibre 6 are added to the bentonite dispersion in a sigma blade mixer 9 or equivalent, glass fibres should generally be added last;

c. the wet mix is fed into an extruder 10 equipped with a pipe die;

d. the extruded pipe, having a circumference equal to or slightly larger than the width of sheet required and a wall thickness equal to the thickness of sheet required, is cut longitudinally;

e. the cut pipe is mechanically opened to form a sheet, and rolled to ensure flatness, as it passes along a conveyor;

f. the sheet is edge trimmed and cut into the required lengths; steps *d, e,* and *f* being carried out at a suitable splitting, opening, rolling and trimming station 11;

g. the cut sheets are suitably supported and dried in a suitable drying oven 12 under conditions that do not cause distortion (e.g. a 4.5 mm sheet can normally be dried at 110° C. in less than 2 hours, provided at least one surface is totally exposed).

h. the dried sheets are fired in a suitable furnace 13 at a temperature within the range 650°–725° C. for a period of 30–60 minutes.

i. the sheets are cooled to ambient temperature at a cooling station 14 and are subsequently stacked at a stacking station 15.

FIG. 1 shows the flow sheet for this process.

Many variations on the above process are possible. For example, using a suitable die, a flat sheet can be extruded directly, or an infinite range of profiles can be achieved using existing extrusion technology.

In addition to the processes already described, the material can also be formed by the conventional spray lay-up techniques of reinforced plastics technology, or by slip casting.

While one object of the invention is to provide a material with properties similar to A.C., another is to improve upon those properties where such improvements are advantageous. Aspects of R.S.C. which are regarded as improvements are:

a. Simpler forming process.
b. More rapid forming process.
c. Use of cheap natural raw materials all requiring (except for glass fibre) little preparation.
d. Small process water requirement.
e. Avoidance of the use of hazardous fibres.
f. High fibre resistance.
g. Low movement due to variations in moisture content.
h. Ability to accept low-temperature ceramic glazes.

It is also obvious that the ease with which R.S.C. can be extruded extends the range of product possibilities beyond that commonly produced in asbestos cement. Extrusion of A.C. requires the use of water-soluble polymer additives which are expensive and may interfere with the curing characteristics of the material.

Examples of traditional asbestos-cement products which could be replaced by R.S.C. are:

Flat sheets
Shingles
Moulded and straited sheets
Insulating boards
Building planks
Decorated sheeting
Corrugated sheets
Roofing accessories (e.g. ventilators, skylights)
Gutters
Downpipes
Flue pipes
Pressure pipes
Sewer pipes
Conduit
Flooring sheets
Other possible R.S.C. products are:
Window frames and sills
Floor planks
Replacement for structural timber
Pottery ware
Sanitary ware
Outdoor furniture

I claim:

1. A method of producing reinforced thin sectioned clay based articles, such as sheets, pipes or the like, having a modulus of rupture of at least 10 MPa and a modulus of elasticity no greater than 16 GPa, including the steps of forming a shaped mixture comprising the following ingredients in substantially the proportions specified by percentage weight of the total solids in the composition:

Fibrous reinforcement selected from the group consisting of glass fibre, carbon fibre, mineral wool, ceramic fibre, asbestos or mixtures of two or more thereof — 1% to 30%

Clay selected from the group consisting of montmorillonitic clay, kaolinitic clay, illitic clay, or mixtures of two or more thereof — 5% to 95%

Fillers — 0% to 90%
Water — 20% to 100% drying the shaped mixture, and firing the dried shapes at a temperature in the range of 500° C. to 800° C. for a time sufficient to produce substantial stabilisation against redispersion in water of the clay in the composition without forming a ceramic article therefrom.

2. A method according to claim 1, wherein the composition contains 0% montmorillonitic clay.

3. A method according to claim 1, wherein the composition includes one or more deflocculants.

4. A method according to claim 1 wherein the firing temperature falls within the range 600° C. to 725° C.

5. A method according to claim 4 wherein the composition is dried for at least 1½ hours at a temperature in excess of 100° C. prior to firing.

6. A method according to claim 1 wherein the maximum particle size of at least 95% of the composition solid components does not exceed 200 microns.

7. A method according to claim 6 wherein at least 20% of the particles are less than 2 microns in diameter.

8. A method according to claim 7 wherein 30% to 60% of the particles are less than 2 microns in diameter.

9. A method according to claim 1 wherein a glaze is applied to the clay based article after drying prior to firing.

10. A method of producing a reinforced clay based article comprising forming a shaped mixture consisting essentially of the following ingredients in the proportions specified by percentage weight of the total solids in the composition:-
Fibrous reinforcement — 3% to 15%
Montmorillonitic Clay — 0% to 7%
Kaolinitic Clay — 20% to 80%
Illitic Cay — 20% to 80%
Fillers — 0% to 40%
Water — 30% to 35%
drying the shaped mixture, and firing the dried shape at a temperature in the range 500° C. to 800° C., for a time sufficient to substantially stabilise the clay in the composition against redispersion in water, without forming a ceramic article therefrom, the sum total of clay in the composition falling within the range 40% to 80% by weight of total solids.

11. A method according to claim 10 wherein the fibrous reinforcement is chosen from textile glass fibre, wool glass, carbon fibre, mineral wool, ceramic fibre and asbestos and mixtures thereof.

12. A method according to claim 11 wherein the fibrous reinforcement is E-glass fibre.

13. A method according to claim 10 wherein the fillers are chosen from talc, pulverized fuel ash, fine silica, diatomaceous earth, feldspars and blast furnace slag and mixtures thereof.

14. A method according to claim 10 wherein the composition includes one or more deflocculants.

15. A method according to claim 14 wherein the deflocculants are chosen from the group consisting of sodium hexametaphosphate, sodium silicate, sodium metasilicate, Dispex N40 and Orotan 850.

16. A method according to claim 10 wherein the composition includes one or more fluxes to increase surface hardness and reduce the rate of water absorption.

17. A method according to claim 16 wherein the flux or fluxes are present in the proportions 0.5% to 2% by weight of total solids in the composition.

18. A method according to claim 16 wherein the flux or fluxes are chosen from boric acid and lithium carbonate.

19. A method according to claim 10 wherein the composition includes water soluble cellulose derivatives and/or solutions of polyethylene oxide to improve plasticity and extrusion properties.

20. A method according to claim 10 wherein the montmorillonitic clay is bentonite.

21. A clay based article, in which total clay content falls within the range of 5% to 95% of total solids by weight prepared by forming a shaped mixture consisting essentially of the following ingredients in the proportions specified by percentage weight of the total solids in the composition:
Fibrous reinforcement — 1% to 30%
Montmorillonitic Clay — 0% to 14%
Kaolinitic Clay — 0% to 95%
Illitic Clay — 0% to 95%
Fillers — 0% to 90%
Water — 20% to 100% of
drying the shaped mixture, and firing the dried shape at a temperature in the range 500° to 800° C., for a time sufficient to substantially stabilise the clay in the composition against redispersion in water, without forming a ceramic article therefrom.

22. A clay based article as claimed in claim 21 wherein the composition components, firing time and firing temperature are chosen such that a flat sheet produced thereby having a thickness of 4.5 mm has a modulus of rupture of at least 10 MPa.

23. A clay based article as claimed in claim 22 wherein the flat sheet has a modulus of rupture of at least 20 MPa.

24. A clay based article as claimed in claim 19 in the form of an extrusion.

25. A clay based article as claimed in claim 21 wherein the fibrous reinforcement is chosen from the group consisting of textile glass fibre, wool glass, carbon fibre, mineral wool, ceramic fibre and asbestos and mixtures thereof.

26. A clay based article as claimed in claim 21 wherein the fillers are chosen from the group consisting of talc, pulverised fuel ash, fine silica, diatomaceous earth, feldspars and blast furnace slag and mixtures thereof.

* * * * *

UNITED STATES PATENT AND TRADEMARK OFFICE
CERTIFICATE OF CORRECTION

PATENT NO. : 4118236
DATED : 3rd October 1978
INVENTOR(S) : CLIVE ARNOLD ERSKINE It is certified that error appears in the above—identified patent and that said Letters Patent are hereby corrected as shown below:

Column 4, line 6 - "$Al_1$" should read --$Al_2$--

Column 14, line 30 - "20% to 100% of" should read --20% to 100%--

Column 14, line 44 - "Claim 19" should read --Claim 21--

In the abstract, last line, reads a period (.) first instance, should read --comma (,)--

Signed and Sealed this

Sixth Day of February 1979

[SEAL]

Attest:

RUTH C. MASON
Attesting Officer

DONALD W. BANNER
Commissioner of Patents and Trademarks